US007409445B2

(12) United States Patent
Markos et al.

(10) Patent No.: US 7,409,445 B2
(45) Date of Patent: Aug. 5, 2008

(54) METHOD FOR FACILITATING MONITORING AND SIMULTANEOUSLY ANALYZING OF NETWORK EVENTS OF MULTIPLE HOSTS VIA A SINGLE NETWORK INTERFACE

(75) Inventors: George B. Markos, Wallkill, NY (US); Balachandar Rajaraman, Cary, NC (US); Bruce H. Ratcliff, Red Hook, NY (US); Anthony R. Sager, Red Hook, NY (US); Arthur J. Stagg, Raleigh, NC (US); Stephen R. Valley, Valatie, NY (US)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 10/855,029

(22) Filed: May 27, 2004

(65) Prior Publication Data

US 2005/0267967 A1 Dec. 1, 2005

(51) Int. Cl.
*G06F 15/173* (2006.01)
(52) U.S. Cl. ...................... 709/224; 709/223
(58) Field of Classification Search ............... 709/223, 709/224, 230, 228, 219
See application file for complete search history.

(56) References Cited

U.S. PATENT DOCUMENTS

| 5,365,509 | A | 11/1994 | Walsh ........................ 370/13 |
|---|---|---|---|
| 5,457,806 | A | 10/1995 | Kitamura .................... 395/800 |
| 5,572,533 | A | 11/1996 | Sunada et al. ............... 371/20.1 |
| 5,740,438 | A | 4/1998 | Ratcliff et al. .............. 395/680 |
| 5,790,554 | A | 8/1998 | Pitcher et al. ............... 370/471 |
| 5,826,018 | A | 10/1998 | Vixie et al. .............. 395/200.6 |
| 6,044,401 | A | 3/2000 | Harvey ........................ 709/225 |
| 6,233,449 | B1 | 5/2001 | Glitho et al. ................ 455/423 |
| 6,330,615 | B1 | 12/2001 | Gioquindo et al. .......... 709/236 |
| 6,330,616 | B1 | 12/2001 | Gioquindo et al. .......... 709/236 |
| 6,334,154 | B1 | 12/2001 | Gioquindo et al. ......... 709/236 |
| 7,299,277 | B1* | 11/2007 | Moran et al. ................ 709/224 |
| 2001/0047400 | A1* | 11/2001 | Coates et al. ................ 709/219 |
| 2002/0013840 | A1* | 1/2002 | Border et al. ............... 709/224 |
| 2002/0116485 | A1* | 8/2002 | Black et al. ................. 709/223 |
| 2003/0074463 | A1* | 4/2003 | Swartz et al. ............... 709/230 |
| 2004/0054785 | A1* | 3/2004 | Driever et al. .............. 709/228 |

OTHER PUBLICATIONS

IBM Technical Disclosure Bulletin, "Switchable Network Connection Unit," L.E. Cashman, D.R. Charlamb, D.W. Gilligan and C.M. Olsen, vol. 38, No. 04, Apr. 1995, p. 529.
"Sniffer Pro—Getting Started Guide," Release 4.7, Sniffer Technologies, Mar. 2002, Part No. NAI-415-0011-3.

* cited by examiner

*Primary Examiner*—Le Luu
(74) *Attorney, Agent, or Firm*—Arthur Ortega, Esq.; Blanche E. Schiller, Esq.; Heslin Rothenberg Farley & Mesiti P.C.

(57) ABSTRACT

The substantially simultaneous tracing/monitoring of a plurality of sets of events via a single network interface. The plurality of events can be traced and/or monitored for one host or for a plurality of hosts coupled via the same network interface. The sets of events to be traced/monitored for a host are defined by the host and maintained in one or more configuration files. The configuration files may be dynamically updated.

16 Claims, 6 Drawing Sheets fig. 1 fig. 2 fig. 3A fig. 3B fig. 4 fig. 5 fig. 6

METHOD FOR FACILITATING MONITORING AND SIMULTANEOUSLY ANALYZING OF NETWORK EVENTS OF MULTIPLE HOSTS VIA A SINGLE NETWORK INTERFACE

TECHNICAL FIELD

This invention relates, in general, to tracing and monitoring of network events, and in particular, to facilitating the substantially simultaneous tracing and/or monitoring of a plurality of sets of network events for one or more hosts using a single network interface.

BACKGROUND OF THE INVENTION

A communications environment is provided that enables multiple hosts, such as multiple operating systems, to be connected to one or more networks via a single network interface. For example, an Enterprise Systems Architecture (ESA)/390 System, offered by International Business Machines Corporation, includes a host to network interface that facilitates connecting multiple operating systems residing in one or more partitions to one or more networks via a single network interface. While the sharing of a single network interface by multiple hosts has provided various advantages, it has also caused difficulties in, for instance, the tracing and monitoring of network data across the single network interface. For example, the tracing of one specific set of events for one host and the tracing of a different set of events for another host at the same time is not possible. Additionally, even the tracing of different sets of events for one host at the same time is not possible.

Moreover, the monitoring of data for a specific host is not provided. That is, there is no delineation of the data received via the interface for one host versus another. Further, the monitoring of different sets of events for one host at the same time is not enabled. Thus, a need exists for a capability that facilitates the analysis of network data received across a single interface. For example, a need exists for a capability that allows the tracing of one specific set of events for one host and the tracing of a different set of events for another host at substantially the same time. As a further example, a need exists for a capability that allows the tracing of a plurality of sets of events for one host at substantially the same time. As yet another example, a need exists for a capability that enables the monitoring of data for a specific host. A need also exists for a capability that enables the monitoring of a plurality of events sets for a host at substantially the same time.

SUMMARY OF THE INVENTION

The shortcomings of the prior art are overcome and additional advantages are provided through the provision of a method of facilitating the analysis of events of a communications environment. The method includes, for instance, providing a set of one or more events for a first host of the communications environment; and providing another set of one or more events for a second host of the communications environment to enable substantially simultaneously analysis of the set of one or more events and the another set of one or more events via a single network interface.

As one example, the first host and the second host are the same host. As a further example, the first host and the second host are different hosts.

In one embodiment, the events are traceable events, and the substantially simultaneously analysis includes substantially simultaneously tracing the set of one or more traceable events and the another set of one or more traceable events via the single network interface.

In a further embodiment, the events are network traffic monitoring events for traffic traveled via the single network interface, and the substantially simultaneously analysis includes substantially simultaneously monitoring the set of one or more network traffic monitoring events and the another set of one or more network traffic monitoring events via the single network interface.

In yet a further embodiment, a method of facilitating the monitoring of events of a communications environment is provided. The method includes, for instance, defining a set of network events to be monitored for a selected host of a plurality of hosts coupled to a same network interface; and monitoring the set of network events for the selected host, the monitoring comprising checking data received via the same network interface.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In one or more aspects of the present invention, a capability is provided to facilitate the analysis of events via a single network interface. For example, a capability is provided to facilitate the substantially simultaneous tracing of multiple sets of events for one or more hosts (e.g., operating systems, protocol stacks, etc.) via a same (e.g., single) network interface. As a further aspect of the present invention, a capability is provided to facilitate the monitoring of network traffic destined for a particular host and received via a network interface used by one or more hosts. These capabilities are included in tracing/monitor or sniffer code executing within a communications adapter of the network interface or in a separate device coupled thereto.

Figure 1:
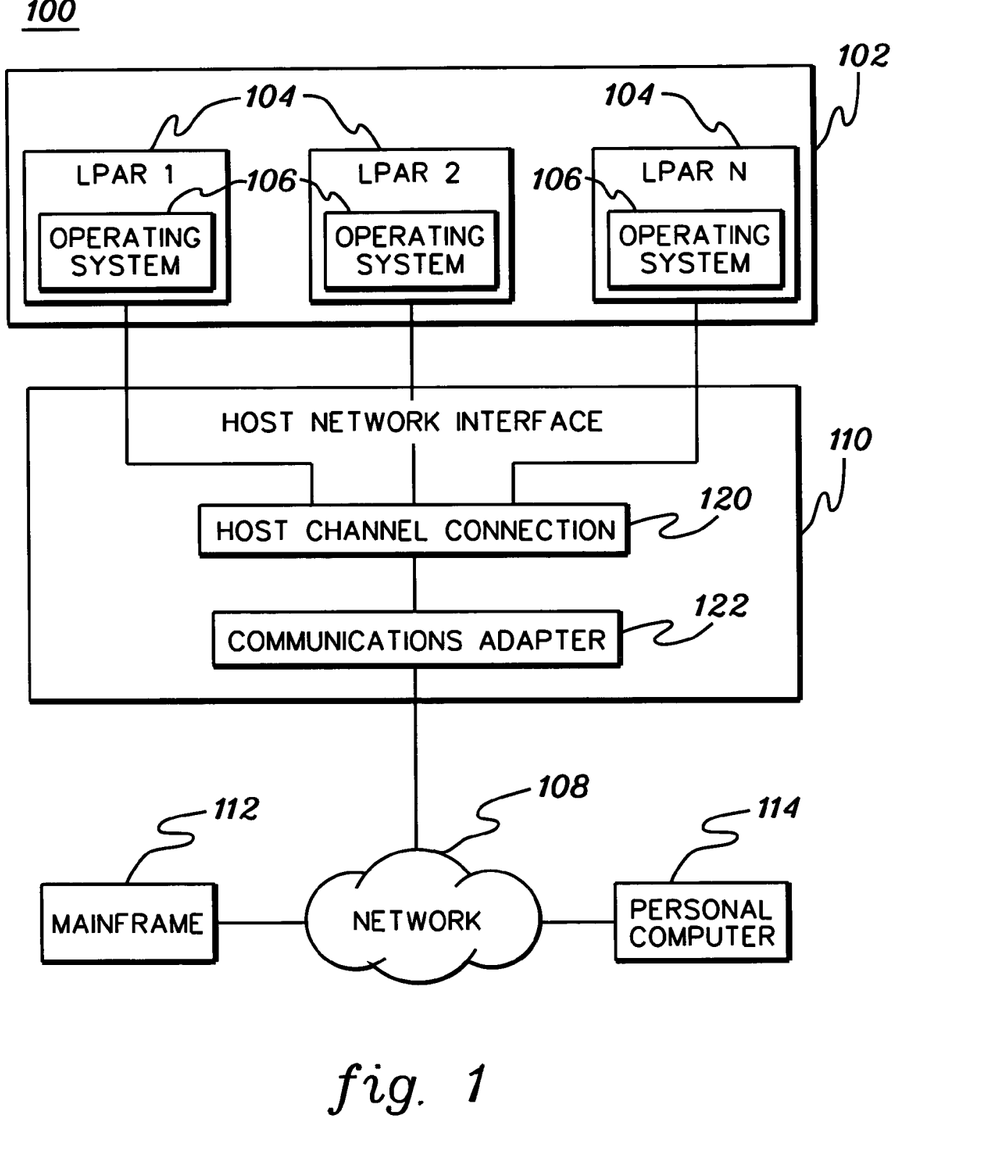
FIG. 1 depicts one embodiment of a communications environment incorporating and using one or more aspects of the present invention.

One embodiment of a communications environment incorporating and using one or more aspects of the present invention is described with reference to FIG. 1. Communications environment 100 includes at least one system 102, such as a physical machine or central processor complex, which is logically partitioned into a plurality of partitions 104. The system is based, for instance, on the Enterprise System Architecture (ESA)/390, offered by International Business Machines Corporation, Armonk, N.Y., an example of which is described in an IBM publication entitled "Enterprise Systems Architecture/390 Principles Of Operation," IBM Publication No. SA22-7201-07, July 2001, which is hereby incorporated herein by reference in its entirety.

Each logical partition 104 of system 102 is capable of operating independently, as if it was a separate computer system. There are various mechanisms for providing logical partitions, an example of which is described in, for instance, Guyette et al., U.S. Pat. No. 4,564,903, entitled "Partitioned Multiprocessor Programming System," issued on Jan. 14, 1986; Bean et al., U.S. Pat. No. 4,843,541, entitled "Logical Resource Partitioning Of A Data Processing System," issued on Jun. 27, 1989; and Kubala, U.S. Pat. No. 5,564,040, entitled "Method And Apparatus For Providing A Server Function In A Logically Partitioned Hardware Machine," issued on Oct. 8, 1996, each of which is hereby incorporated herein by reference in its entirety.

Each logical partition 104 is capable of executing an operating system 106, which may differ for each partition. An example of an operating system that may execute within a logical partition is the OS/390 operating system, offered by International Business Machines Corporation, Armonk, N.Y. Other operating systems may also be employed.

Logical partitions 104 are coupled to at least one network 108 via a host network interface 110. Network 108 may be one of various networks, including, for instance, a local area network (LAN), a wide area network (WAN), etc. Further, the network may be of different media types. For example, a LAN can be a Fiber Distributed Data Interface (FDDI), a token ring, an Ethernet, etc. Network 108 is coupled to one or more computing units, such as a mainframe 112 or a personal computer 114, which sends data to and/or receives data from logical partitions 104 via network 108.

Network 108 employs host network interface 110 in coupling the computing units to the logical partitions. Host network interface 110 reduces network overhead at the multiple partitions, and includes, for instance, a host channel connection 120 and a communications adapter 122. As one example, host channel connection 120 is an IBM Enterprise Systems Connection (ESCON) channel connector used to couple the logical partitions to communications adapter 122, and communications adapter 122 is, for instance, an IBM Open Systems Adapter (OSA) used to couple the logical partitions to the network. Communications adapter 122 includes a connection to each Transmission Control Protocol/Internet Protocol (TCP/IP) stack in each logical partition.

Additional details regarding a host network interface are described in U.S. Pat. No. 5,740,438, Ratcliff et al., entitled "Method and System for Network Communications of Multiple Partitions," issued on Apr. 14, 1998; and U.S. Pat. No. 6,330,615, Gioquindo et al., entitled "Method of Using Address Resolution Protocol For Constructing Data Frame Formats For Multiple Partitions Host Network Interface Communications," issued Dec. 11, 2001, each of which is hereby incorporated herein by reference in its entirety. Moreover, additional details relating to communications adapters are described below.

In one example, communications adapter 122 includes a network interface card (NIC) 200 (FIG. 2), which is an industry standard card used to couple the host network interface to a network; and a virtualization layer 202, which is used to couple the hosts to the network interface card. The virtualization layer enables each host to believe it has its own NIC, even though the NIC is shared. The virtualization layer is also used to provide support for one or more aspects of the present invention, as described below.

Figure 2:
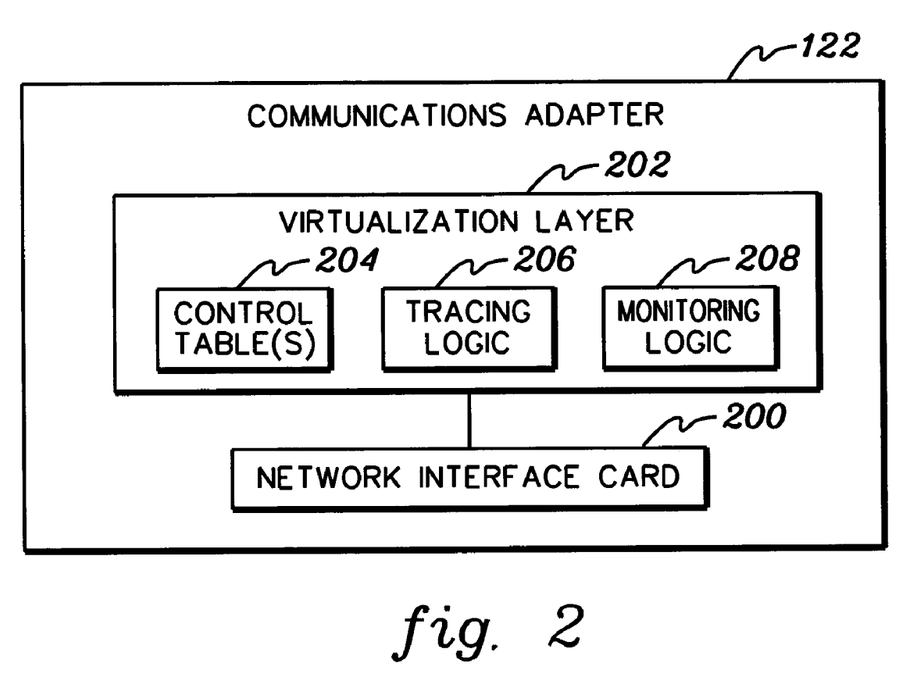
FIG. 2 depicts further details of a communications adapter of the communications environment of FIG. 1, in accordance with an aspect of the present invention.

Virtualization layer 202 includes one or more control tables and logic used to facilitate analysis (e.g., tracing and/or monitoring) of events, in accordance with one or more aspects of the present invention. For example, virtualization layer 202 includes at least one control table 204 used to identify the particular events to be traced or monitored. In one embodiment, there is one control table used for both tracing and monitoring. However, in the embodiment described herein, there is at least one control table used for tracing and at least one control table used for monitoring.

Figure 3A:
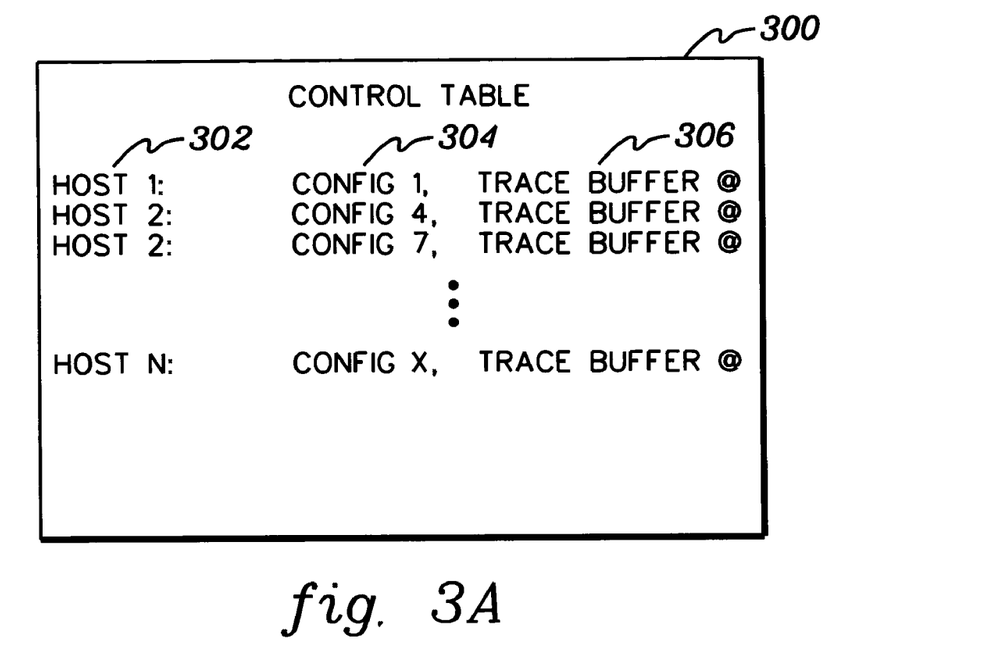
FIGS. 3a-3b depict examples of control tables stored within the communications adapter of FIG. 2 and used in accordance with an aspect of the present invention.

For example, FIG. 3a depicts a control table 300, which is used for tracing. Control table 300 includes, for instance, a list of one or more hosts 302 for which a configuration file 304 is defined. The configuration file specifies for its host the set of one or more events to be traced for that host. These events are defined by the host and then passed to the virtualization layer. Each host has its own configuration file, which may be the same or different from the configuration file of another host. Further, for each host, one or more configuration files may be defined. That is, Host X may have one configuration file defined specifying one set of traceable events and another configuration file defined specifying another set of traceable events. By having configuration files specified for one or more hosts, various traces can be performed substantially simultaneously (i.e., one trace can overlap the running time of another trace, either partially or in entirety).

Referring further to FIG. 3a, also associated with each identified host is a trace buffer address (@) 306. The trace buffer address specifies an address in memory of the communications adapter at which the trace data that is captured is to be stored. As one example, each trace is allocated a maximum of 1 MB. In this example, the total size of the trace buffer is 8 MB, thus, allowing up to eight traces to be running simultaneously. The eight traces can be for one host or for a plurality of hosts. The specification of eight traces, 1 MB for each trace and 8 MB total buffer size are only examples. In other embodiments, each trace and/or the trace buffer can be of different sizes. Additionally, more or less than eight concurrent traces can be executing.

In addition to a control table for tracing, in a further aspect of the present invention, a control table 320 (FIG. 3b) is used for specifying events to be monitored for one or more hosts. Control table 320 includes, for instance, one or more hosts 322 for which monitoring is to take place; one or more configuration files 324 specifying the events to be monitored for the hosts; and one or more monitor buffer addresses 326, each indicating an address in the adapter's memory at which the monitored data is to be stored.

Figure 3B:
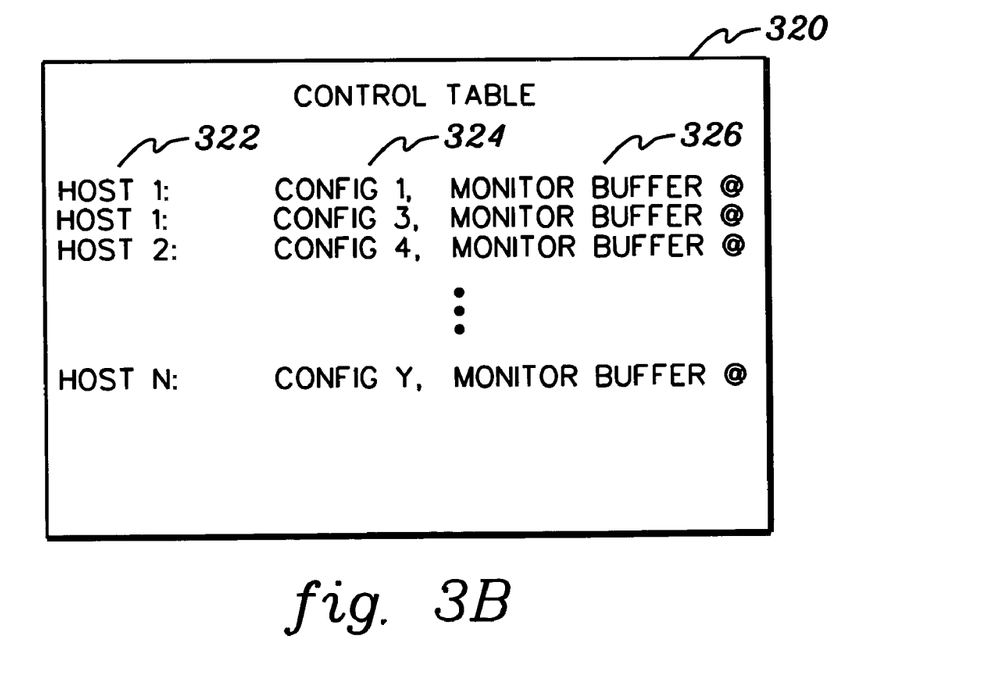

As one example, the events to be monitored are related to the traffic from the network to a single host or multiple hosts. Thus, a configuration file 324 indicates a set of events related to network traffic that is to be monitored. This may include, for instance, the number of packets destined for a host; an amount of memory used; the number of packets that match a particular IP address; etc.

The monitor buffer need not have the same size requirements or constraints as the trace buffer, since the monitor buffer is merely maintaining counters. In other embodiments, however, other information may be stored, thus, mandating certain requirements and/or constraints.

The control tables are used by logic that facilitates tracing and/or monitoring. As shown in FIG. 2, virtualization layer 202 also includes tracing logic 206 used to obtain the specific events to be traced for a particular host, to trace those events and to capture data relating to those events; and monitoring logic 208 used to obtain the specific events to be monitored for a host, to monitor those events and to capture data relating to those events.

One embodiment of the tracing logic is described with reference to FIG. 4. In this embodiment, the logic includes configuring, tracing and capturing of data for a particular host. Similar steps would be followed for each host wishing to participate in tracing.

Figure 4:
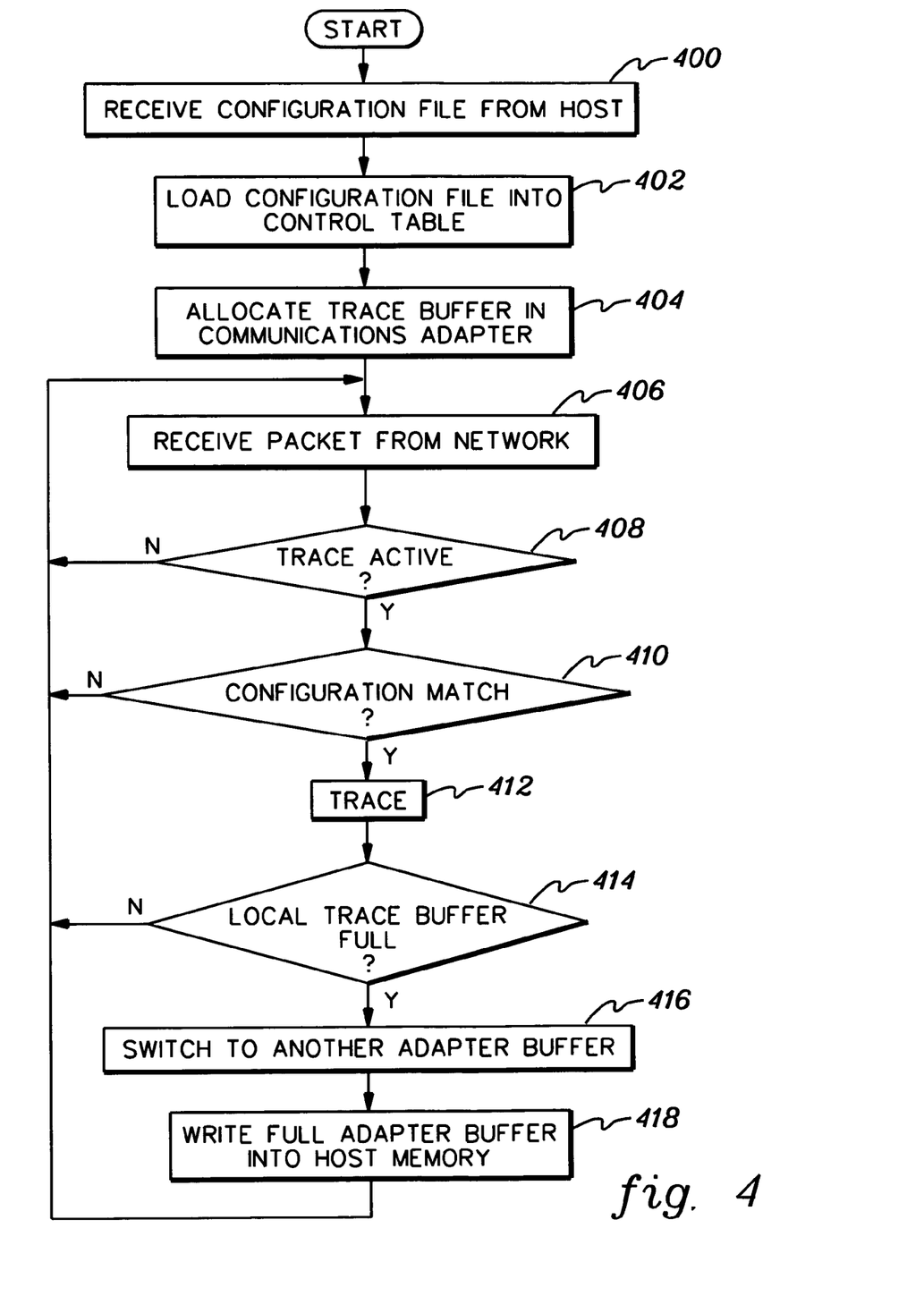
FIG. 4 depicts one embodiment of the logic associated with tracing events and capturing data, in accordance with an aspect of the present invention.

Referring to FIG. 4, initially, a configuration file is received from a host, such as an operating system executing within a logical partition, STEP 400. The host builds the file by, for instance, using a graphical user interface to display a panel to select the events to be traced or to type in the desired events to be traced. The built configuration file is defined by that host. The host forwards the file to the memory of the virtualization layer, which then takes the configuration file from its memory and stores it in the control table at the appropriate location (i.e., the location for the specified host), STEP 402.

A trace buffer (or trace buffer segment) is also allocated in the communications adapter for the particular host, STEP 404. For example, a trace buffer segment is allocated in the memory of the virtualization layer at an address provided by the host and specified in the control table.

Subsequently, a packet is received from the network, STEP 406, and a determination is made as to whether tracing is active for the host destined to receive the packet, INQUIRY 408. This determination is made by, for instance, checking an indicator in a designated control block. If tracing is not active, then the packet is forwarded to the host and processing of the tracing logic continues with "Receive Packet From Network," STEP 406. However, if tracing is active, then a further determination is made as to whether data in the packet matches the one or more events designated in the configuration file for this host, INQUIRY 410.

To determine whether there is a configuration match, the tracing logic passes through the information specified in the configuration file, creates one or more filters (or rules) from the information, and uses the filters to determine whether an event is to be recorded. In particular, the trace filters are used to specify what to trace. There is a hierarchy to the trace filters, and the tracing logic analyzes each filter in order. If any higher level filter is not passed, there is no trace and no further checking is performed.

There are many types of trace filters, examples of which are described in "Sniffer Pro Getting Started Guide" by Network Associates, ISBN #NAI-415-0011-3, March 2002, which is hereby incorporated herein by reference in its entirety. Some examples of filters in order from higher level to lower level are described below for one particular scenario. Many other filters and/or scenarios can be employed without departing from the spirit of the present invention.

1. First filter is based on unique OSA device which is mapped from user's input combination CSS.MIF.CU.D-EVADDR to QDIO_DATAPATH_ENTRY. If trace is turned on for this device, or if in trace all mode, then proceed to next filter, otherwise do nothing, i.e., OSA business as usual.

2. The virtualization layer code does the checking for inbound, outbound or LPAR to LPAR traffic. The tracing filter would be checked at the end of each of these functions. If yes, go to next filter.

3. The virtualization layer code determines if the packet is unicast, broadcast or multicast. The tracing filter would be checked at the end of the virtualization layer code. (MAC headers are one option for tracing. A MAC header for an Ethernet media includes a source address, destination address, protocol type. Other tracing options include, but are not limited to, VLAN headers, protocol headers having a source address and a target address; transport headers having a source port and a destination address; and raw mode having a data offset/data pattern.)

4. Check if this is VLAN or non VLAN traffic.
    If this is not VLAN traffic, and VLAN filter is off, then continue;
    If this is not VLAN traffic, and VLAN filter is on, then do not trace;
    If this is VLAN traffic, and VLAN filter is off, then do not trace;
    If this is VLAN traffic, and VLAN filter is on, then continue.
    To turn VLAN filter on, user specifies value for up to 8 VLAN tags. If user wants to capture all VLAN traffic, regardless of incoming packet's VLAN tag, then user specifies 'trace all' value for VLAN tag.

5. IP level filters distinguish between ARP and IP datagrams.
    Filters based on IP version, i.e. IPV4 vs. IPV6. This filter will determine what kind of host/client IPs will be used.
    Filters based on client's IP's. User can specify up to 8 client IPs. For inbound and LPAR-to-LPAR traffic, these IP addresses are compared to source IP addresses. For outbound traffic they are compared to destination addresses.
    Filters based on host's IP's. User can specify up to 8 host IPs. For inbound and LPAR-to-LPAR traffic, these IP addresses are compared to destination IP address. For outbound traffic they are compared to source address.

6. Higher level protocol filters granulate further based on ports. The logic supports TCP, UDP and ICMP (even though ICMP is part of the networking layer-IP, here it is sorted together with TCP and UDP, because it comes after the regular IP frame). In ICMP, case port filters are ignored.
    Filters based on client's ports. User can specify up to 8 client ports. For inbound and LPAR-to-LPAR traffic, these ports are compared to source ports. For outbound traffic they are compared to destination ports.
    Filters based on host ports. User can specify up to 8 host ports, as an example. For inbound and LPAR-to-LPAR traffic, these ports are compared to destination ports. For outbound traffic, they are compared to source ports.

If the incoming packet fails one or more of the filters of the configuration file, then the packet is passed to the host, and the tracing logic continues with STEP 406 "Receive Packet From Network." However, if all of the filters are passed, then tracing is initiated, STEP 412. For instance, using the above filters as an example, if the packet passes all the filters, then the tracing logic traces MAC header (MAC with VLAN if trace VLAN was turned on), if trace MAC filter is on; IP header, if trace IP filter is on same is true for ARP, and higher level protocol headers.

The amount of actual data that is traced, depends on the trace entry size. The user specifies the size of the each individual trace entry. When tracing, the tracing logic ensures that the trace entry does not exceed this limit, i.e., it can be smaller but not larger. For example, if a user wants X bytes of data per each entry, but at the same time there is more than X bytes of data, the trace will include the first X bytes. Each trace entry includes a trace type identifier (4 bytes), a time stamp (4 bytes) and trace data. The trace size that the user specifies includes the first two entries, as well as the data, so the minimal size of a trace entry is 8 bytes. The trace data is written to a trace buffer located at the address specified in the control table for the host.

The trace buffer is a local buffer, and, in this example, a 1 MB segment of the buffer is assigned to the host. Although a 1 MB segment is assigned, that segment is considered as having two parts, in order to allow tracing to be unaffected by a full condition. When one part is full, a switch is made to the other part. Thus, a determination is made as to whether the local trace buffer is full (i.e., is the part being written to full), INQUIRY 414. If the local trace buffer is not full, then processing continues with "Receive Packet From Network," STEP 406. However, if the local trace buffer is full, then a switch is made to another adapter buffer (or another part of the designated segment of the adapter buffer), STEP 416. Subsequently, the full adapter buffer is written into memory locations within the host, STEP 418, and processing continues with "Receive Packet From Network," STEP 406.

Figure 5:
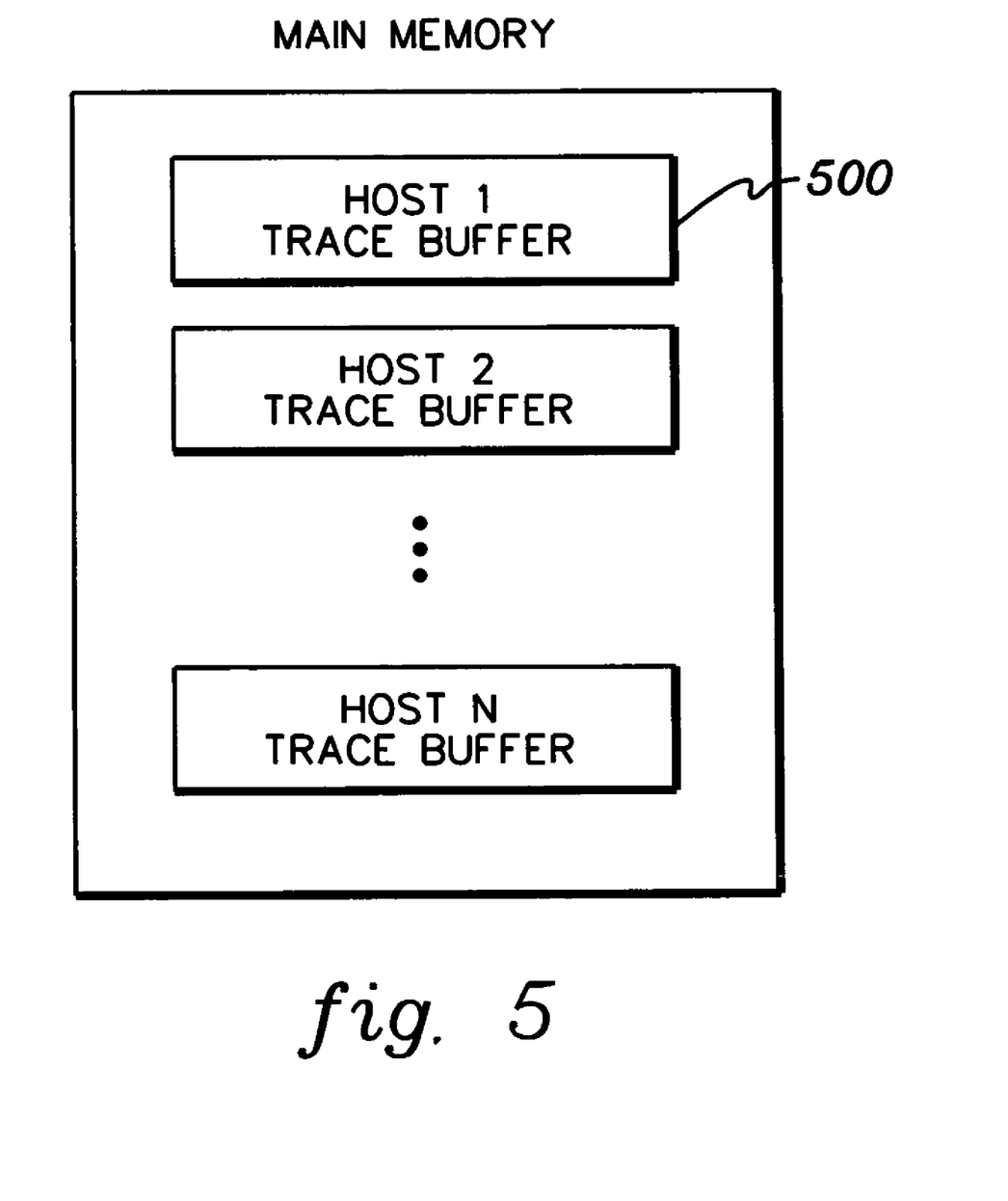
FIG. 5 depicts one embodiment of a main memory of a communications environment having multiple trace buffer segments, in accordance with an aspect of the present invention.

In main memory, there are, for instance, eight trace buffer segments 500 (FIG. 5) for the eight possible traces. If all eight traces are for one host, then all eight buffer segments are for that host. Likewise, if one or more of the traces are for one or more other hosts, then one or more of the segments are for the one or more other hosts. In other embodiments, the segments may be considered as other buffers, rather than segments of one buffer.

With the tracing logic described above, one or more sets of traceable events can be defined for one host. Thus, the logic can accept multiple configuration files from a host and can compare a received packet to the multiple configuration files. If a match is found, then the traced data is written into the buffer segment specified for the configuration file having the match.

In accordance with a further aspect of the present invention, one or more events may be monitored by monitoring logic 208 (FIG. 2). The events to be monitored may be for one host or for a plurality of hosts. Regardless of the number of hosts, each set of events to be monitored is specifically defined for a host. The data captured is stored in a buffer segment associated with the particular events being monitored.

One embodiment of the logic associated with monitoring events, in accordance with an aspect of the present invention, is described with reference to FIG. 6. In the example, the events being monitored are related to network traffic traveling via the single host network interface.

Figure 6:
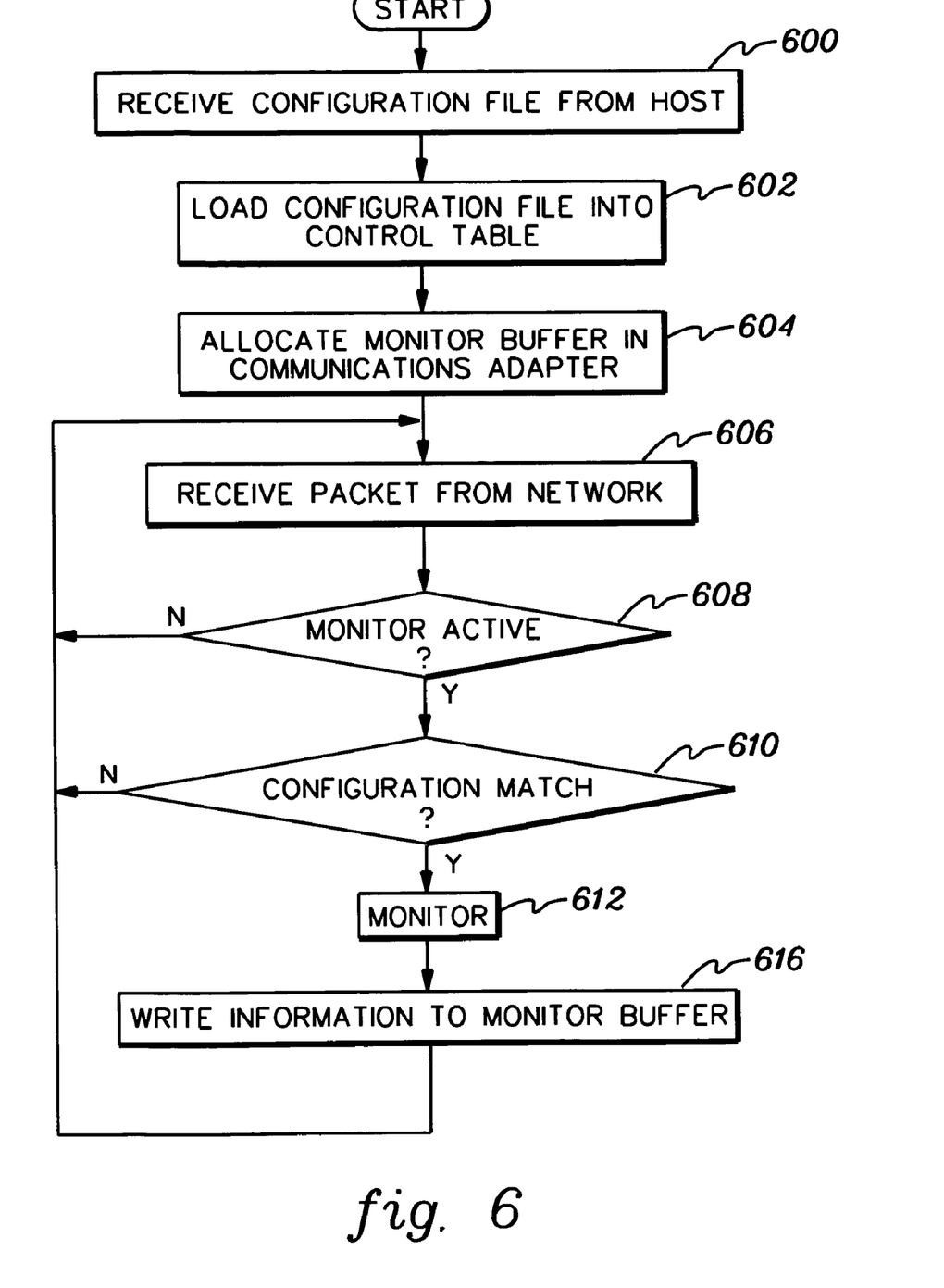
FIG. 6 depicts one embodiment of the logic associated with monitoring network traffic received over a single network interface, in accordance with an aspect of the present invention.

Referring to FIG. 6, initially, a configuration file is forwarded from a host to the virtualization layer of the communications adapter, STEP 600. The configuration file specifies one or more events that are to be monitored for the host. The virtualization layer stores the configuration file in the control table at a location specified by the host, STEP 602.

A monitor buffer (e.g., a buffer segment) is allocated in the communications adapter for the particular host, STEP 604. For example, the monitor buffer is allocated in the memory of the virtualization layer at an address provided by the host and specified in the control table.

Subsequently, a packet is received from the network, STEP 606, and a determination is made as to whether monitoring is active for the host destined to receive the packet, INQUIRY 608. This determination is made by, for instance, checking an indicator in a designated control block. If monitoring is not active, then the packet is forwarded to the host and processing of the monitoring logic continues with "Receive Packet From Network," STEP 606. However, if monitoring is active, then a further determination is made as to whether the data in the packet matches the one or more events designated in the configuration file for this host, INQUIRY 610.

To make this determination, the monitoring logic passes through the information specified in the configuration file, creates one or more filters (or rules) from the information, and uses the filters to determine whether an event is to be monitored. In particular, the filters are used to specify what to monitor. There is a hierarchy to the filters, and the monitoring logic analyzes each filter in order. If any higher level filter is not passed, there is no monitoring and no further checking is done, i.e., execution flow continues with "Receive Packet From Network," STEP 606. Otherwise, monitoring is initiated, STEP 612.

During monitoring, counters associated with the events being monitored are incremented upon encountering a particular event, as one example. The counts (or other information, in another embodiment) are then written to the specified monitor buffer, STEP 616. Processing then continues with "Receive Packet From Network," STEP 606.

Similar to the tracing logic, with the monitoring logic, one or more sets of network monitoring events can be defined for one host. Thus, the logic can accept multiple configuration files from a host and can compare a received packet to the multiple configuration files. If a match is found, then the monitored statistics are written into the buffer segment specified for the configuration file having the match.

Described in detail above are capabilities to facilitate the tracing and/or monitoring of specific events for various hosts connected via a same network interface. The definitions provided in the configuration files are dynamic in that they are defined by the host and can be changed by the host, even while tracing/monitoring is in progress.

The logic described in here provides many advantages over previous analyzers. For example, prior analyzers (a.k.a., local area network (LAN) sniffers) for hosts or network protocols are typically dedicated computers configured with a network interface card for each LAN type that can be sniffed/analyzed. They are characterized by the following:

1. These sniffer units require their own dedicated physical connection from the sniffer's network interface card (NIC) into the networking switch where the LAN segment is defined. Depending upon the type of sniffer and respective network interface card,
   sniffing copper based networks (i.e., Cat-5 wiring) require a single dedicated physical connection;
   sniffing for other based networks, like ATM and GbE, require either a single dedicated physical connection or an in-line optical splitter.
2. The more advanced network switches provide port or VLAN mirroring support for using a LAN sniffer. However, since a switch does not support more than one port being mirrored at a time, only one port or LAN segment can be analyzed at a time in any switch.
3. A network administrator (human) is required to manually configure port mirroring on the network switch by activating a specific port to be mirrored to the sniffer and specifying which port or VLAN is to be mirrored/copied over to the sniffer attached port.

4. Activating port mirroring on a network switch introduces processing overhead on the switch and therefore other ports not involved or identified in the port mirroring configuration can experience impact in the form of increased latency or delays.
5. Current LAN analyzers only capture data from one specific set of events. If multiple different captures are required, then multiple runs or multiple LAN analyzers are required. Since a communications adapter, such as the OSA adapter, can be shared across multiple hosts, the need to trace the LAN traffic to multiple different hosts at the same time has become more prevalent.
6. One LAN analyzer is needed for each unique LAN media type (i.e., token ring, FDDI, Fast Ethernet, etc.)
7. No means of monitoring the percentage of the LAN traffic which is being routed to each of the various hosts, which are simultaneously connected to a single LAN interface.

Advantageously, one or more aspects of the present invention overcome the above-noted deficiencies. For example, one or more aspects of the present invention:

Remove the dedicated physical connection by utilizing the existing connection from the communications network (e.g., OSA) to the network switch;
Eliminate the need for optical splitters on fiber based networks;
Eliminate the single port mirroring per switch limitation, regardless of switch OEM. Advantageously, multiple simultaneous LAN sniffing activities, regardless of the OEM network switch, are provided;
Eliminate human intervention associated with port mirroring configuration and activation on the network switch;
Remove the overhead or latency on the switch introduced by port mirroring activation;
Remove the cost and respective overhead associated with maintaining a separate network (e.g., LAN) sniffer computer, such as initial purchase cost of sniffer capable computer; maintenance or service contract costs associated with the actual sniffer computer and/or sniffer software; hardware upgrades with respect to the cost of each separate network interface card type needed; and software upgrade overhead-having to install new releases of sniffer software on the sniffer computer;
Unique captures can be set up for each host without affecting another host. The information in the specific trace is only relevant for the specific host. The use of the capture filters needed to trace the data for a specific host are greatly simplified and there can be multiple captures running at the same time through the single network (e.g., LAN) interface;
Give the user the ability to monitor any one, multiple or all of the network (e.g., LAN) utilization being used by the various hosts connected to the single network interface;
The network (e.g., LAN) analyzer is now media independent and no/minimum changes are required to switch between network media types; and
The data can be stored in a standardized format, which allows the current LAN analyzer vendors the ability to write an application which would format the data to be compatible with their existing formatters.

Advantageously, one or more aspects of the present invention allow a distinction to be made between the requested data for each host. Further, each host has the ability to dynamically control the setting of the individual traces. Events from multiple hosts may be analyzed/monitored simultaneously. In particular, the ability is provided to trace/monitor multiple hosts at the same time through the same LAN interface. A dynamic configuration and the ability to trace/monitor different events for each host through a single LAN interface is provided.

Tracing and/or monitoring for one or more hosts can occur at the same time (e.g., one can overlap the other in part or in total).

Although examples are provided herein, these are only examples. There may be many variations to the examples without departing from the spirit of the present invention. For example, the communications environment may include more or less logical partitions or may have zones other than LPARs. Further, the environment can be based on architectures other than ESA. Other networks and/or other media types can be employed. Moreover, there can be other computing units coupled to the network. Many other variations are also possible.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating the analysis of events of a communications environment, said method comprising:
   providing a set of one or more events for a first host of said communications environment; and
   providing another set of one or more events for a second host of said communications environment to enable substantially simultaneously analysis of the set of one or more events and the another set of one or more events via a single network interface.

2. The method of claim 1, wherein the events are traceable events, and the substantially simultaneously analysis comprises substantially simultaneously tracing the set of one or more traceable events and the another set of one or more traceable events via the single network interface.

3. The method of claim 2, further comprising substantially simultaneously tracing said set of one or more traceable events for said first host and said another set of one or more traceable events for said second host via the single network interface.

4. The method of claim 3, further comprising capturing data resulting from the tracing of the set of one or more traceable events and the another set of one or more traceable events, wherein the captured data for the set of one or more traceable events is distinct from the captured data of the another set of one or more traceable events.

5. The method of claim 3, further comprising changing at least one of the set of one or more traceable events and the another set of one or more traceable events, during the tracing.

6. The method of claim 1, wherein the events are network traffic monitoring events for traffic traveled via the single network interface, and the substantially simultaneously analysis comprises substantially simultaneously monitoring the set of one or more network traffic monitoring events and the another set of one or more network traffic monitoring events via the single network interface.

7. The method of claim 6, further comprising monitoring the set of one or more network traffic monitoring events for said first host and substantially simultaneously monitoring the another set of one or more network traffic monitoring events for the second host.

8. The method of claim 1, wherein the first host and the second host are the same host.

9. The method of claim 1, wherein the first host and the second host are different hosts.

10. The method of claim 1, wherein said set of one or more events for said first host is different than said another set of one or more events for the second host.

11. The method of claim 1, wherein said set of one or more events is specifically defined for said first host, and said another set of one or more events is specifically defined for said second host.

12. The method of claim 11, further comprising dynamically defining, by said first host, said set of one or more events for said first host.

13. The method of claim 1, wherein said first host comprises an operating system of a logical partition of said communications environment and said second host comprises another operating system of another logical partition of said communications environment, and wherein said logical partition and said another logical partition are coupled to said single network interface.

14. The method of claim 1, wherein said first host comprises an operating system of said communications environment and said second host comprises another operating system of the communications environment.

15. The method of claim 1, further comprising dynamically changing at least one of the set of one or more events and the another set of one or more events.

16. A method of facilitating monitoring of events of a communications environment, said method comprising:
defining a set of network events to be monitored for a selected host of a plurality of hosts coupled to a same network interface; and
monitoring the set of network events for the selected host, said monitoring comprising checking data received via the same network interface.

* * * * *